3,256,327
OXYGEN SPARGING DURING THE BROMINE-PEROXIDE CATALYZED ISOMERIZATION OF MALEIC ACID TO FUMARIC ACID

Joseph L. Russell, Ridgewood, N.J., and Harry Olenberg, Bronx, N.Y., assignors to Halcon International, Inc., a corporation of Delaware
No Drawing. Filed Apr. 8, 1965, Ser. No. 446,695
6 Claims. (Cl. 260—537)

This application is a continuation-in-part of U.S. application Serial Number 305,548, filed August 29, 1963, now abandoned, which is a continuation-in-part of U.S. application, Serial Number 61,383, filed October 10, 1960, now abandoned.

This invention relates to a process for preparing fumaric acid. More particularly, this invention is directed to an improved process for preparing fumaric acid of good color from maleic acid.

Fumaric acid is a commercially valuable material which may be obtained by the isomerization of maleic acid at elevated temperatures or in the presence of certain catalytic materials. An especially advantageous method for preparing fumaric acid involves the isomerization of maleic acid employing catalytic amounts of a soluble bromine providing compounds together with an oxidizing agent having an oxidizing strength of at least about 1.23 volts.

It is an object of this invention to provide an improved process for the preparation of fumaric acid from maleic acid.

It is a futher object of the invention to provide an improved process for preparing fumaric acid which involves treating aqueous maleic acid with a soluble bromine providing compound and an oxidizing agent having an oxidizing strength of at least about 1.23 volts.

Other objects will be apparent from the following description of the invention.

In accordance with this invention, fumaric acid is prepared by treating aqueous maleic acid with catalytic amounts of a soluble bromine providing compound and an oxidizing agent having an oxidizing strength of at least about 1.23 volts in the presence of molecular oxygen. We have made the surprising discovery that when maleic acid is isomerized to fumaric acid employing as isomerization agents said bromine providing compound and said oxidizing agent, significant improvements in product fumaric acid color are obtained when the isomerization is carried out in the presence of molecular oxygen. When the isomerization is carried out using the said isomerization agents but without the use of molecular oxygen, the upper temperature which can be employed is limited since at higher temperatures the product color deteriorates. In the practice of the present invention, higher temperatures can be employed in the process while retaining excellent fumaric acid color characteristics. Thus the process becomes much less sensitive to temperature variations. The invention is especially applicable to the preparation of fumaric acid having excellent color from dark colored aqueous scrubber liquors which contain varying amounts of maleic acid and which are commercially obtainable from either maleic anhydride or phthalic anhydride processes. However, the present process is also advantageously used for isomerizing aqueous solutions of highly pure maleic acid.

The preferred practice of the invention involves continuously sparging a molecular oxygen-containing gas through the reaction mixture during the process for preparing fumaric acid using the bromine compound and oxidizing agent above referred to. However, the invention can also be practiced by maintaining the reaction mixture under an atmosphere of air during the reaction, preferably at an elevated air pressure.

By "bromine providing compound" is meant any soluble compound which, when in contact with the oxidizing agent, forms a mono or dioxy bromo complex. Examples of the broad classes of these compounds are: inorganic bromides wherein the bromine has a valence of —1; bromine; and N-bromamides, N-bromoimides, acyl bromides and inorganic hypomites wherein the bromine has a valence of +1.

The specific examples of the soluble bromides include the alkali metal bromides such as lithium bromide, sodium bromide, potassium bromide, rubidium bromide, and cesium bromide; alkaline earth bromides such as beryllium bromide, magnesium bromide, calcium bromide, strontium bromide, cadmium bromide and barium bromide; Group V bromides including those of vanadium and bismuth; Group VII bromides such as maganese bromide; and Group VIII bromides such as iron, nickel and copper bromide. Additionally, hydrobromic acid and ammonium bromides as well as polybromides such cadmium ammonium bromides.

N-bromoamides having the formula RCONHBr, N-bromoimides having the formula $R(CO)_2NBr$, and organic acyl bromides having the formula RCOBr are effective, wherein the R is a hydrocarbon radical such as an alkyl, aryl, alkenyl, or aralkyl group having from one to 18 carbon atoms and in the case of N-bromoimides is a constituent of an imide-forming dicarboxylic acid. Examples of the acyl bromides are acetyl bromide, propionyl bromide, n-butyryl bromide, isobutyryl bromide, n-valeryl bromide, isovaleryl bromide, n-caproyl bromide, capryl bromide, stearoyl bromide, and benzoyl bromide. Illustrative of the N-bromoamides are N-bromo-acetamide, N-bromo-propionamide, N-bromo-n-butyramide, N - bromo - n - valeramide, N-bromo-n-caproamide, N-bromo-benzamide. Closely analogous to the aforesaid amides are the N-bromoimides such as N-bromosuccinimide and N-bromo-phthalimide. The above organic bromine compounds are effective because they readily hydrolyze when introduced into the maleic acid solution. The hydrolysis results in the formation of HBr which, as pointed out above, is an effective bromine providing compound.

The soluble organic hyprobromites include the alkali metal and alkaline earth metal type such as sodium, potassium and calcium hydpobromite. Nitrosyl bromide is still another example.

The bromide compound is used in amounts such that it is present in a concentration of about 0.001 to 10.0%, desirably, 0.01 to 5%, and preferably 0.1 to 3.0% bromine (calculated as $NH_4Br$) based on the weight of maleic acid.

The oxidizing agent employed has an oxidizing strength of at least about 1.23 volts, and is present in an amount corresponding to 0.003 to 10.0% (i.e., on a molar basis of oxidant calculated as ammonium persulfate) desirably 0.1 to 5.0% and preferably 0.5 to 2.7% based on the weight of maleic acid.

The "oxidizing agent" which may be employed include the soluble inorganic persulfates, inorganic peroxides, such as hydrogen peroxide and alkali metal peroxides, and the soluble organic peroxides and hydroperoxides. The persulfates are preferably the ammonium or alkali or alkaline earth metal salts. Specifically, sodium persulfate, potassium persulfate, lithium persulfate, calcium persulfate, manganese persulfate are the most important examples. The organic peroxides include benzoyl peroxide, cyclohexanone peroxide, acetyl peroxide, lauroyl peroxide, and t-butyl peroxide. The hydroperoxides include cumene hydroperoxide, t-butyl hydroperoxide, tetrahydronaphthalene hydroperoxide, methyl ethyl ketone hydroperoxide and methylcyclohexane peroxide.

The process is carried out by subjecting an aqueous maleic acid solution to treatment with the above indicated materials. The initial maleic acid concentration of said solutions can be in the range of 10 to 70% by weight. Suitable temperatures are generally in the range of 40 to 120° C., and preferably 65 to 85° C.

As hereinabove indicated, the invention is preferably carried out by sparging a molecular oxygen-containing gas through the reacting mixture. The oxygen-containing gas may be for example, air or other gases containing molecular oxygen. Examples are pure oxygen, oxygen-enriched air, or oxygen diluted with one or more inert gases.

In place of sparging the molecular oxygen containing gas through the reaction mixture the invention can be carried out by maintaining the reaction mixture under an atmosphere of molecular oxygen-containing gas, preferably at elevated pressure.

More desirably, the reaction is conducted in such fashion that air is sparged through the reaction mixture at moderately elevated pressure, for example about 5 to 100 p.s.i.g., although it will be realized that much higher pressures can be used.

As a less desirable alternative the reaction system can be maintained under reduced pressure and air passed therethrough during the reaction.

The exact amount of molecular oxygen to be employed in carrying out the invention can vary depending upon the temperature and time of the reaction, the purity of the maleic acid solution, the desired color of the fumaric acid product, the nature and derivation of the maleic acid solution, and the like. It is within the skill of those versed in the art to determine optimum conditions for a particular practice of the invention. Broadly, where air is used, the passage through the reaction solution is at a rate of 2 to 5000 volumes of air per volume of solution per hour, preferably 4 to 2000 volumes, and most desirably 25 to 1,500 volumes per volume. With the lower air flow rates, the use of elevated pressures is preferred.

Since the oxygen is the essential ingredient for obtaining the beneficial effect of the instant invention, the above sparging rates may be expressed in terms of the oxygen present in the sparging gas. Broadly, from 1 to 1000 volumes of oxygen per volume of solution per hour, preferably 2 to 400 volumes, most desirably from 4 to 300 volumes per volume. Generally the sparging gas contains at least 5% oxygen, preferably 10%.

The following examples are illustrative of the present invention:

*Example I*

A series of four runs was conducted on a colored maleic acid scrubber liquor previously treated with adsorptive carbon and having a maleic acid concentration of about 35% by weight. In each of the experiments, 0.45 wt. percent of ammonium bromide and 2.70 wt. percent of ammonium persulfate based on the maleic acid were added to the scrubber liquor. In each case, the resulting solution was maintained at 80° C., for 30 minutes, and the product fumaric acid was separated and purified by washing with water. In the run designated as A, air was continuously sparged through the solution at about atmospheric pressure at the rate of 1,000 volumes of air (STP) per volume of solution per hour. In run B, there was no air sparged during the reaction, but the reaction solution was maintained at about atmospheric pressure under air atmosphere. In the run designated as C, air was continuously sparged through the reaction mixture at about atmospheric pressure at an air flow rate of 100 volumes of air (STP) per volume of solution per hour. In run D, air was continuously sparged through the solution at a pressure of 12 p.s.i.g. and at an air flow rate of 100 volumes of air (STP) per volume of solution per hour. The following table shows the conditions of molecular oxygen contact during the reaction as well as the color of the fumaric acid obtained as product. In each case, the fumaric acid yield was about the same.

| | Air Contact Conditions | Glycol Color (Pt Co; APHA) |
|---|---|---|
| Run A | 1,000 volumes of air per volume of reaction solution per hour. | 45 |
| Run B | No air circulation, atmospheric pressure air atmosphere. | 120 |
| Run C | 100 volumes of air per volume of reaction solution per hour. | 55 |
| Run D | 100 volumes of air per volume of solution per hour at 12 p.s.i.g. | 45 |

The above results demonstrate the effect of the conditions of molecular oxygen contact upon the color of product fumaric acid. It will be seen that superior results are obtained in practice of the invention wherein air is continuously passed through the reaction mixture. For products of similar color, a lower air flow rate can be employed where elevated pressures are used.

*Example II*

To an aqueous pure maleic acid solution containing about 35% maleic acid were added ammonium bromide and ammonium persulfate in the amounts described in Example I. The resulting solution was maintained under an air atmosphere at about atmospheric pressure for about 30 minutes. Temperature was maintained by indirect heat exchange at 65–71° C. The product fumaric acid, after separation and washing had an APHA Glycol color of 45–55.

By way of contrast, where the above solution was similarly treated except that no air atmosphere was used and the temperature was maintained at 62.4 to 65° C. by maintenance of partial vacuum, product fumaric acid had an APHA Glycol color of 75–100.

The above illustrates that the use of an air atmosphere resulted in significantly improved product color as compared to the operation under reduced pressure conditions.

*Example III*

(a) To an aqueous colored scrubber liquor previously treated with adsorptive carbon acid containing about 35% maleic acid were added ammonium bromide and ammonium persulfate in the amounts described in Example I. The resulting solution was maintained under an air atmosphere at about atmospheric pressure for about 30 minutes. Temperature was maintained by indirect heat exchange at 65 to 71° C. The product fumaric acid, after separation and washing, had an APHA Glycol color of 45.

(b) In contrast, where the scrubber liquor was similarly treated but no air atmosphere was used and temperature was maintained at 62.4 to 67.2° C. by maintenance of partial vacuum, product fumaric acid had an APHA Glycol color of 70.

(c) Further, by way of contrast, where the scrubber liquor was first purged with $N_2$ and then similarly reacted at 65 to 73° C. under a $N_2$ atmosphere, product fumaric acid APHA Glycol color was 125 to 150.

(d) Part c of this example was repeated except that nitrogen was continuously bubbled through the reaction mixture at a rate of 100 volumes per volume of reaction solution per hour. The nitrogen was essentially pure, containing 0.2% oxygen. The product was tested and has an APHA Glycol color of about 125 to 150.

*Example IV*

Using the same solution as employed in Example II, 25 volumes of air are bubbled through each volume of solution per hour. After 30 minutes at 68° C. a precipitate forms having an APHA Glycol color of 35.

Example V

Example IV is repeated except the air flow rate is reduced to 5 volumes per volume of solution. The APHA Glycol color is 40.

Example VI

Example I is repeated except that the solution is continuously sparged with 1000 volumes of steam per volume of solution per hour. The fumaric acid APHA Glycol color is about 140 to 150.

Example VII

Example I, Run A is repeated except cadmium ammonium bromide is used in place of ammonium bromide. Essentially similar results are obtained.

Example VIII

Example I, Run A is again repeated except that the isomerization catalyst system is cadmium ammonium bromide and hydrogen peroxide. Though the isomerization reaction is somewhat slower, the color of the product is identical.

Example IX

Example I, Run C is repeated using sodium hypobromite as the bromine-providing compound. While the isomerization proceeded more slowly, the color of the product is about APHA Glycol Color 60.

Example X

The ammonium bromide in Example I, Run C is replaced by N-bromosuccinimide. Ammonium persulfate is again used as the oxidizing agent. Results essentially identical with Example I, Run C are obtained.

The APHA Glycol color referred to in the above examples is determined as follows:

A mixture of 22.5 grams of the fumaric acid and 23 cc. of ethylene glycol are thoroughly mixed in a 100 cc. Nessler tube. Nitrogen is bubbled therethrough at 2 to 4 bubbles per second. While maintaining nitrogen flow, the mixture is heated in a furnace or bath at 215° C. for 20 minutes. The APHA color is then measured and the procedure is repeated using only ethylene glycol. The APHA color of the glycol is subtracted from the color of the fumaric acid glycol mixture to give the fumaric acid APHA Glycol color.

It will be understood that modifications and variations may be effected without departing from the spirit of the invention.

What is claimed is:

1. In a process for making fumaric acid wherein an aqueous solution containing about 10 to 70 weight percent maleic acid is contacted with (1) from 0.001 to 10 weight percent based on maleic acid of a water soluble catalyst selected from the group consisting of inorganic bromides; alkali and alkaline earth metal hypobromites; nitrosyl bromide; bromine; N-bromoamides and acyl bromides of up to 18 carbon atoms; and N-bromoimides of internal imide-forming dicarboxylic acids having up to 18 carbon atoms; and (2) from 0.003 to 10 weight percent based on maleic acid of an oxidizing agent selected from the group consisting of ammonium, alkali and alkaline earth metal persulfates; hydrogen peroxide; benzoyl peroxide, cyclohexanone peroxide, methyl-cyclohexane peroxide, acetyl peroxide, lauroyl peroxide and t-butyl peroxide; and cumene hydroperoxide, t-butyl hydroperoxide, tetrahydronaphthalene hydroperoxide and methyl ethyl ketone hydroperoxide at a temperature between 50 and 110° C. thereby precipitating fumaric acid from said solution, the improvement of continuously sparging said solution with a molecular oxygen-containing gas at a rate of 1.0 to 1000 volumes of oxygen per volume of solution per hour during said contacting.

2. A process according to claim 1 wherein the catalyst is cadmium ammonium bromide and wherein the oxidizing agent is ammonium persulfate.

3. A process according to claim 1 wherein the catalyst is cadmium ammonium bromide and wherein the oxidizing agent is hydrogen peroxide.

4. A process according to claim 1 wherein the catalyst is an alkali metal hypobromite and the oxidizing agent is ammonium persulfate.

5. A process according to claim 1 wherein the catalyst is N-bromosuccinimide and wherein the oxidizing agent is ammonium persulfate.

6. A process according to claim 1 wherein the catalyst is ammonium bromide and wherein the oxidizing agent is ammonium persulfate.

References Cited by the Examiner

UNITED STATES PATENTS

| | | | |
|---|---|---|---|
| 1,914,556 | 6/1933 | Conover | 260—537 |
| 2,758,134 | 8/1956 | Dobratz | 260—537 |
| 2,790,827 | 4/1957 | Cummings et al. | 260—537 |
| 2,816,922 | 12/1957 | Stephenson | 260—537 |
| 2,914,559 | 11/1959 | Stefaniak | 260—537 |
| 2,955,136 | 10/1960 | Sullivan et al. | 260—537 |
| 2,979,445 | 1/1961 | Lavigne et al. | 260—537 |
| 3,141,037 | 7/1964 | Olenberg et al. | 260—537 |

OTHER REFERENCES

Kharasch et al.: Journal of the American Chemical Society, vol. 59, page 1155 (1937).

Mayo et al.: Chemical Reviews, vol. 27, pages 351–412 (1940), pages 403–412 relied on.

Wachholtz: Chemical Abstracts, vol. 22, page 908, 3rd full paragraph (1928).

LORRAINE A. WEINBERGER, *Primary Examiner.*

I. R. PELLMAN, *Assistant Examiner.*